H. DETRICK.
DISPLAY BOARD.
APPLICATION FILED SEPT. 13, 1912.

1,074,414.

Patented Sept. 30, 1913.

4 SHEETS—SHEET 1.

WITNESSES:

INVENTOR
Harry Detrick
BY Hardway Cathey
ATTORNEYS

H. DETRICK.
DISPLAY BOARD.
APPLICATION FILED SEPT. 13, 1912.

1,074,414.

Patented Sept. 30, 1913.
4 SHEETS—SHEET 4.

WITNESSES:
C. Baylor Hull
May Montgomery

INVENTOR
Harry Detrick
BY
Hardway & Cathey
ATTORNEYS

UNITED STATES PATENT OFFICE.

HARRY DETRICK, OF HOUSTON, TEXAS.

DISPLAY-BOARD.

1,074,414.   Specification of Letters Patent.   Patented Sept. 30, 1913.

Application filed September 13, 1912. Serial No. 720,203.

*To all whom it may concern:*

Be it known that I, HARRY DETRICK, a citizen of the United States, residing at Houston, in the county of Harris and State of Texas, have invented certain new and useful Improvements in Display-Boards, of which the following is a specification.

My invention relates to new and useful improvements in display boards and has more particular relation to a display board whereon may be represented the movements of the players in the ordinary game of base ball.

The object of the invention is to provide a display board of the character described, representing a base ball diamond and field and provided with electric lights to represent those participating in the game.

Another feature of the invention resides in the provision of a system of electric wiring whereby the movements of the different players may be indicated by the manipulation of a current switch, and whereby certain data incidental to the progress of the game may also be indicated by electric lights on the display board, which are controlled by said electric wiring system.

With the above and other objects in view, the invention has particular relation to certain novel features of construction and operation, an example of which is given in this specification and illustrated in the accompanying drawings, wherein—

Figure 1:
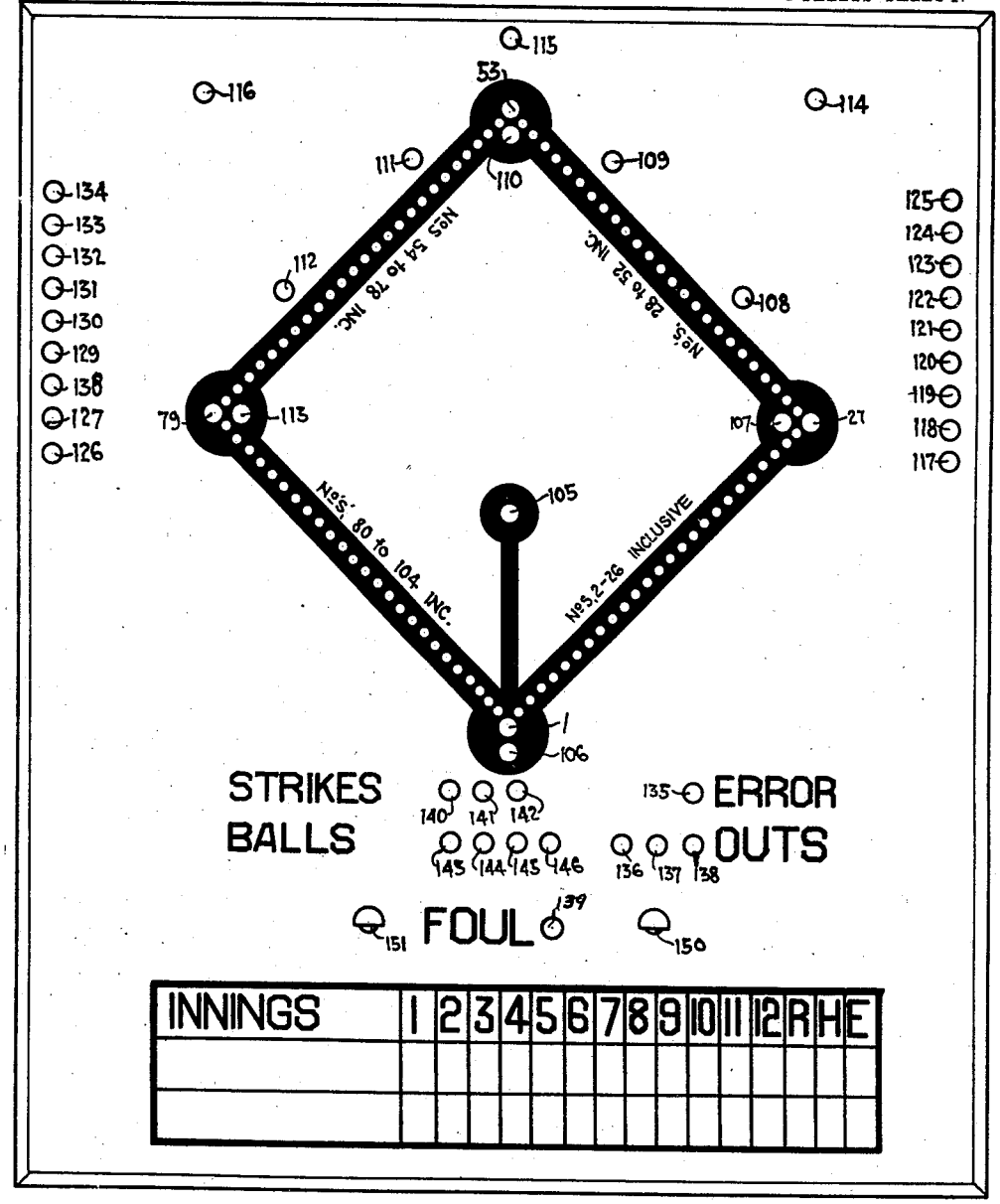
Figure 2:
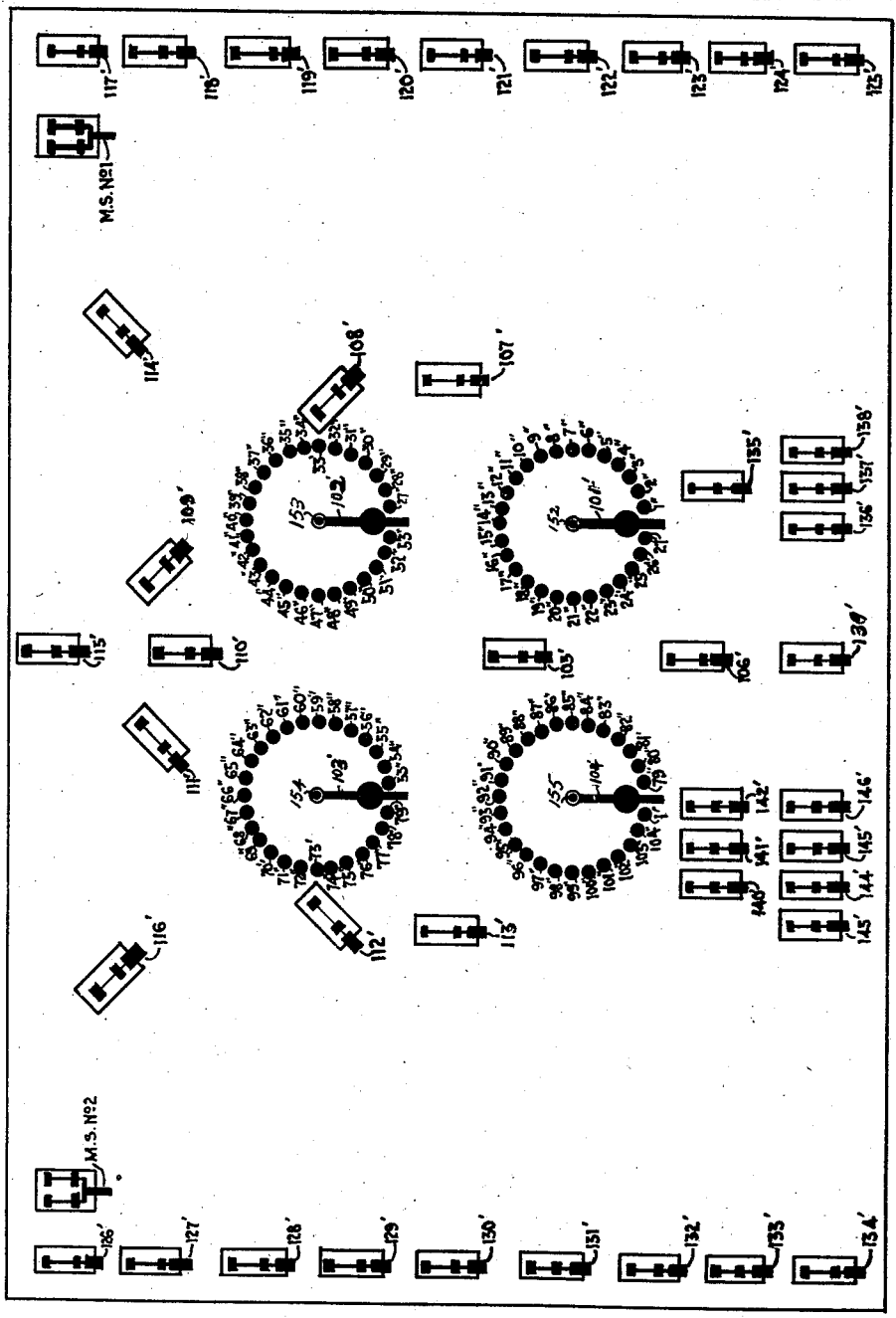
Figure 3:
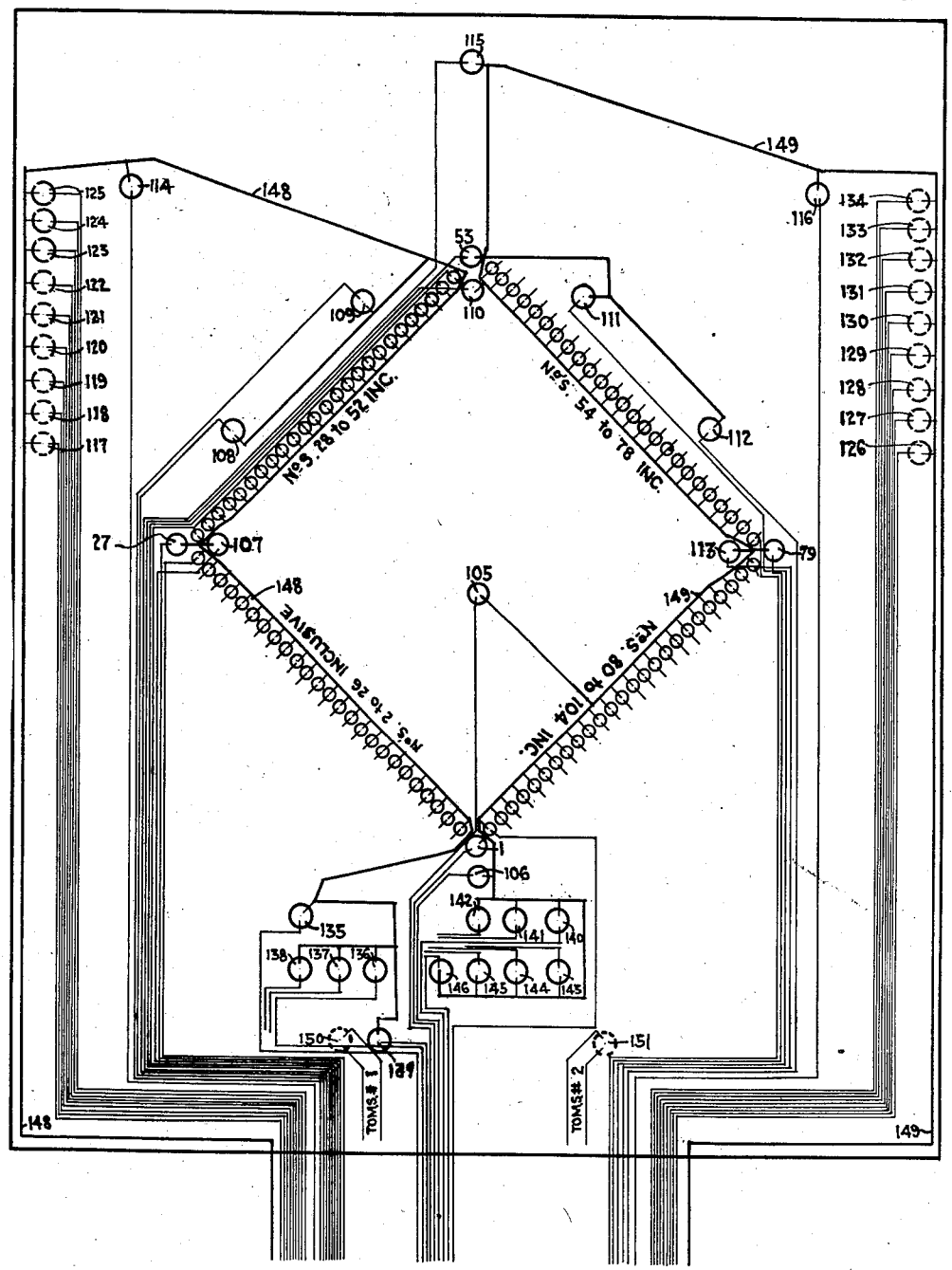
Figure 4:
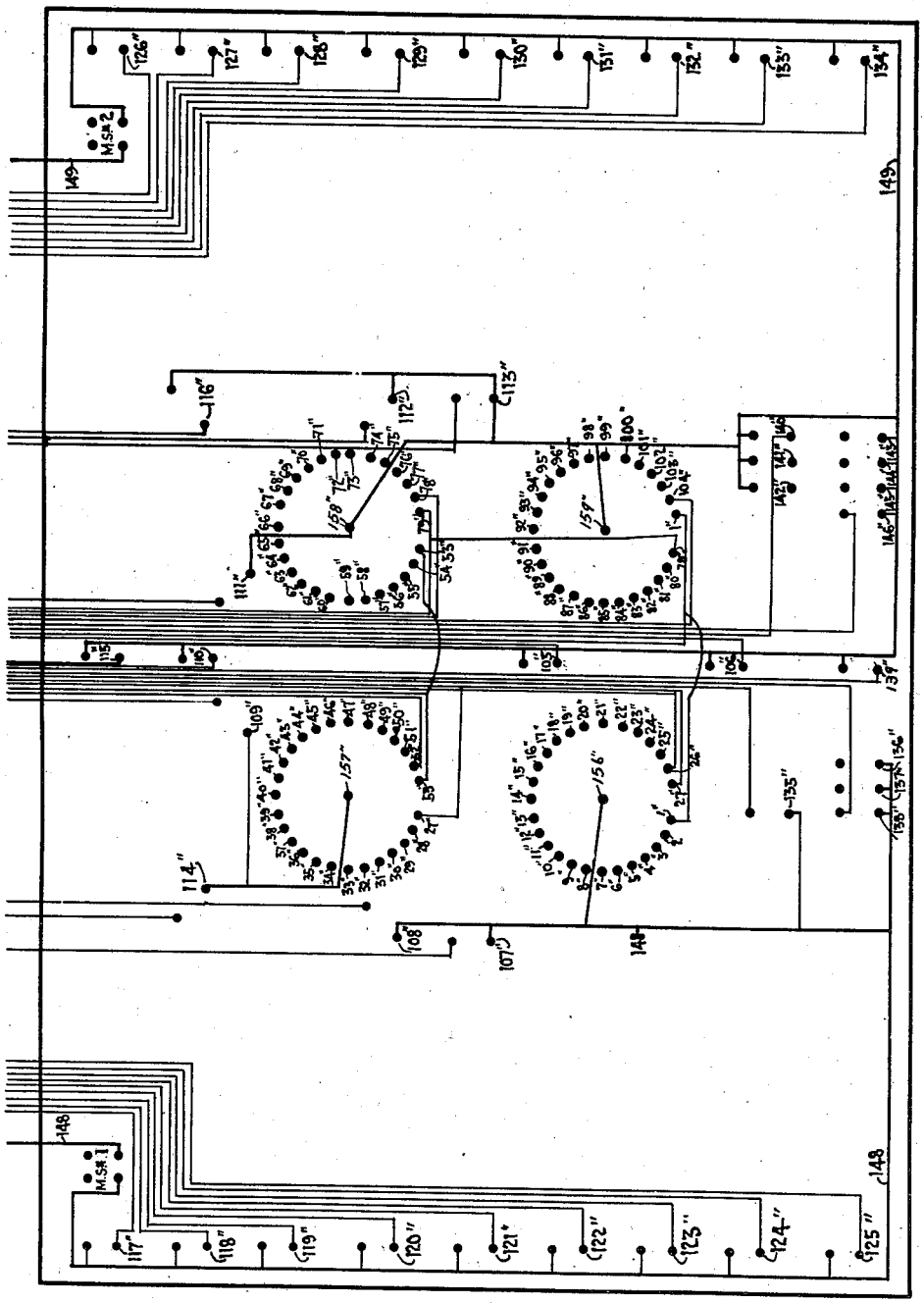

Figure 1 shows a plan view of the diamond and field equipped with electric lights to represent the players and also electric lights provided for the purpose of showing certain data incidental to the progress of the game. Fig. 2 is a plan view of the switch board, showing the switches by means of which the various electric lights are connected with and disconnected from the common electric current wire. Fig. 3 is a reverse, or back view of the field shown in Fig. 1, which shows the electric wiring system, and Fig. 4 is a reverse view of the switch board shown in Fig. 2, Figs. 3 and 4 together showing the complete electric wiring system.

Referring now more particularly to the drawings, the numeral 1 refers to a large electric light which designates the batter and beginning at the home plate and arranged in alinement are a number of smaller electric lights, numbered from 2 to 26 inclusive, which extend to the first base. The runner on first base is represented by a large electric light and indicated by the numeral 27. A row of smaller electric lights, numbered from 28 to 52 inclusive, are alined with each other and extend from first to second base. The runner on second base is represented by a large electric light and indicated by the numeral 53. In a like manner, a row of small electric lights, numbered from 54 to 78, inclusive, are arranged in alinement from second base to the third base. The runner on third base is represented by a large electric light and indicated by the numeral 79, and from said third base to the home plate, a number of small electric lights, numbered from 80 to 104, inclusive, are arranged in alinement, the said electric lights numbered from 1 to 104, inclusive, thus being arranged in the form of a diamond, the home plate and bases being made conspicuous by large lights and the said lights having a back ground of black or some similar decided color, also in the shape of a diamond.

The pitcher is represented by an electric light and designated by the numeral 105, located at the usual place within the diamond and the catcher is represented by an electric light 106, located behind the home plate.

The first baseman, when playing on the base is indicated by a large electric light 107 and when playing off the base is designated by a large electric light 108.

The second baseman when playing off of the base is designated by a large electric light 109, but when playing on the base is indicated by a similar light 110 and in a similar manner the third baseman when off of the base is indicated by an electric light 112 and when playing on the base is indicated by a large electric light 113. Short-stop, right field-man, center field-man and left fieldman are indicated by electric lights, numbered respectively, 111, 114, 115 and 116.

The inactive players of the respective teams awaiting to be called to the bat are indicated by electric lights arranged along the respective side lines, indicated by the numerals 117 to 125, inclusive and by the numerals 126 to 134, inclusive. An error is indicated by an electric light 135 and outs by the electric lights 136, 137 and 138, respectively. Strikes are indicated by electric lights 140, 141 and 142 and in a similar manner balls are indicated by electric lights 143, 144, 145 and 146. The numeral 139 refers to an electric light provided to indicate a foul.

The switches, by means of which the current is completed or broken from the common wires to the electric lights above referred to, are shown on the switch board as illustrated in Fig. 2 and numbered, respectively, from 101' to 146' and the contact points of said switches, with the wires leading to said lights are shown partially in Fig. 3 and completely in Fig. 4 and are designated, respectively, by the numerals 1" to 146", inclusive.

In the form shown, two common wires are used, which are designated, respectively, by the numerals 148 and 149 which are controlled, respectively by two main switches indicated by M. S. No. 1 and M. S. No. 2.

It is to be observed that only the field and diamond, as shown in Fig. 1 is to be exposed to the view of the audience and the switch board shown in Figs. 2 and 4 and the wiring system will be concealed from view, the switch board being placed in some suitable place so that the switches may be readily manipulated.

Beneath the diamond is arranged a score board of the usual form and above this score board are placed two electric lights 150 and 151, equipped with reflectors which will reflect the light upon the score board where a permanent score is kept, showing the result of the game by innings.

It is to be observed that while I have shown two common wires for conducting the electric current, it is possible to use only one common wire and all of the lights may be fed from this single wire and either one or two common wires may be used, as is found most desirable. I desire to call attention particularly, however, to the fact that I have provided a great number of electric lights which are fed from a common current conducting wire. For each light there is a current conducting wire leading from the common wire through the light and again connecting with the common wire. This current conducting wire is controlled by a corresponding switch, hereinbefore referred to, by means of which the current may be completed through the light or the connection broken.

This device may be illustrated in the following manner:—Before the game begins, all of the switches are open. When it is desired to begin the display of the game, main switches No. 1 and 2 should be closed and the current will thus be sent through the common wires 148 and 149. The lights indicating the movements of the players are still invisible when the players take their places on the side lines, before the game begins. When a player, as for example, the one represented by the light 117, goes to the bat, the corresponding switch is closed and the light 117 becomes visible and at the same time the switch 101' is moved to contact point 1" and the light 1, representing the home plate, becomes visible and indicates that the batter is ready to receive a ball from the pitcher. The switch 105' is then closed on its contact point 105" and the light 105, representing the pitcher, becomes visible. As the ball passes from the pitcher and is caught by the catcher, the switch 105' is opened and the switch 106' closed and the light 105 becomes invisible and the light 106 visible. If in the meantime a strike was called, the same may be indicated by closing the switch 140' upon the contact point 140", which will render the light 140 visible. In a similar manner, a ball, an error or an out may be indicated. In case the batter moves from the home plate toward first base, the switch 101' should be moved successively to the contact point 2", 3", 4", etc. in accordance with the movements of the runner and in case he reaches the first base, the switch 101' should be moved to the contact point 27". In the meantime, all of the fielders will remain invisible, except the one executing a play and his movements will be indicated by closing the corresponding switch which will render the light representing said fielder visible. If the base runner reaches the first base, the switch 102' should be moved to its contact-point 27" which will operate to hold the base runner on the first base and the switch 101' may be then moved back to its neutral point as shown in Fig. 2. The switch corresponding to the light 117 should then be opened, which will render light 117 invisible and the switch corresponding to the light 118 should be closed and said light will then be rendered visible and at the same time, the switch 101' moved to its contact point 101" which will render visible the light 1 and indicate that the second batter is up. The movements of the pitcher and catcher, as well as the batter may be indicated as hereinbefore described and the movements of the base runner on the first base may also be indicated by a suitable manipulation of the switch 102'.

The lights indicating the home plate and the three bases, as well as the lights indicating the movements of the runner around the diamond should be red or some other distinctive color, so as to render the movements of the base runner conspicuous.

It is to be observed that all of the lights are invisible except those indicating the different players in action. When a play has been executed, the light indicating the player which executed said play is rendered invisible by opening the corresponding switch.

It is obvious that any material play on the part of any player on the diamond or in the field may be indicated by closing the proper switch upon the proper contact point and the number of strikes, balls, errors and outs may be indicated in the same manner.

The switches 101', 102', 103' and 104' are pivoted, respectively, at the points 152, 153, 154 and 155, and are arranged to swing around said pivotal points so as to contact successively with the contact points 1″ to 27″, 27″ to 53″, 53″ to 79″ and 79″ to 104″, respectively, said contact points being arranged in a circle therearound, as shown in Figs. 2 and 4; the said switches being in constant contact with the common wires 148 and 149 at the points 156″, 157″, 158″ and 159″.

It is to be observed that there are two contact points 27″, by which the light 27 may be controlled, likewise two contact points 53″ by means of which the light 53 may be controlled and also two contact points 79″ by means of which the electric light 79 may be controlled and two contact points 1″ by means of which the light 1 may be controlled.

When the switch 101' is brought into contact with the contact point 27″, the light 27 will become visible, the switch 102' should then be brought into contact with its contact point 27″, which will operate to hold the light 27 visible, when the switch 101' is moved back to contact point 1″ so as to render the electric light 1 visible and to indicate that another man is up. In like manner, when the switch 102' has been moved around to contact with the contact point 53″, the switch 103' should be moved to contact with its contact point 53″ while switch 102' is being moved back to the contact point 27″. Likewise, when the switch 103' has been moved around to the contact point 79″, the switch 104' should be moved to its contact point 79″, so as to hold the light 79 visible, when the switch 103' is moved back to its original position; the lights 27, 53 and 79 thus being provided with two contact points, through either one of which the said lights may be connected with their corresponding common conducting wire by proper manipulation of their corresponding switches.

From the foregoing specification and the drawings accompanying the same and made a part thereof, it is obvious that the movements of each player may be readily indicated by a suitable manipulation of the switch corresponding to said player and that a record of the game may also in a similar manner be indicated as the game progresses.

The diamond and field indicated by the Fig. 1 will probably be shown on the stage of a dark room, in easy view of the audience, while the switch board and the wiring will be concealed from view, the switch board being located at some convenient place for the manipulation of the switches.

This device is intended to be used for reporting games of baseball which are being actually played and as the information is conveyed to the manipulator, he can readily transmit the same to the audience in the manner hereinbefore indicated.

What I claim is:—

In a display board, a score board proper, a plurality of series of lamps arranged thereon in the form of a diamond, a switch board, a plurality of series of contact points arranged thereon for controlling the lamps, of the series forming the diamond, electrical connections between the contact points of each series and the lamps of the corresponding series of the diamond controlled thereby, a switch for each series of contact points, the switch of any particular series being arranged to be brought into contact successively with the points of said series whereby the lamps of the corresponding series of the diamond will be successively, illuminated and extinguished and a means electrically connecting the last contact point of one series with the first contact point of the succeeding series.

In testimony whereof I have signed my name to this specification in the presence of two subscribing witnesses.

HARRY DETRICK.

Witnesses:
   J. W. WOODS,
   MAY MONTGOMERY.